(12) United States Patent
Nardini et al.

(10) Patent No.: US 11,426,694 B2
(45) Date of Patent: Aug. 30, 2022

(54) PERFECTED HEAT EXCHANGER AND AIR DRYING SYSTEM USING THE AFORESAID HEAT EXCHANGER

(71) Applicant: CECCATO ARIA COMPRESSA S.R.L., Brendola (IT)

(72) Inventors: Maurizio Nardini, Torsa di Pocenia (IT); Alessandro Falcone, Padua (IT); Massimo Bellosi, Lonigo (IT)

(73) Assignee: Ceccato Aria Compressa S.R.L., Brendola (IT)

( * ) Notice: Subject to any disclaimer, the term of this patent is extended or adjusted under 35 U.S.C. 154(b) by 35 days.

(21) Appl. No.: 16/758,350

(22) PCT Filed: Oct. 23, 2018

(86) PCT No.: PCT/IB2018/058252
§ 371 (c)(1),
(2) Date: Apr. 22, 2020

(87) PCT Pub. No.: WO2019/082078
PCT Pub. Date: May 2, 2019

(65) Prior Publication Data
US 2020/0254386 A1     Aug. 13, 2020

(30) Foreign Application Priority Data
Oct. 23, 2017   (IT) ........................ 102017000119692

(51) Int. Cl.
*B01D 53/26* (2006.01)
*B01D 5/00* (2006.01)
(Continued)

(52) U.S. Cl.
CPC ......... *B01D 53/265* (2013.01); *B01D 5/0075* (2013.01); *F28D 7/0066* (2013.01);
(Continued)

(58) Field of Classification Search
CPC .......... F28D 2021/0038; B01D 5/0075; B01D 5/0015; B01D 53/265
See application file for complete search history.

(56) References Cited

U.S. PATENT DOCUMENTS

| 5,715,696 | A | * | 2/1998 | Salvagno | .................. F28F 9/22 |
| | | | | | 62/272 |
| 5,727,623 | A | * | 3/1998 | Yoshioka | .............. F28D 9/0012 |
| | | | | | 165/113 |

(Continued)

FOREIGN PATENT DOCUMENTS

| DE | 20 2014 102885 U1 | 7/2017 |
| EP | 3 097 971 A1 | 11/2016 |

(Continued)

OTHER PUBLICATIONS

International Search Report and Written Opinion dated Feb. 25, 2019, issued in PCT Application No. PCT/IB2018/058252, filed Oct. 23, 2018.

*Primary Examiner* — Devon Russell
(74) *Attorney, Agent, or Firm* — Workman Nydegger

(57) ABSTRACT

A heat exchanger includes: a cooler/heater, an evaporator and a condensate separator, provided with inlet lines and outlet lines through which flows develop in countercurrent to each other for obtaining through the cooler/heater an incoming flow of hot and humid air and an outgoing flow of cooled cold air. The cooler/heater, the evaporator and the condensate separator are independent units from each other joined by a connection for defining a single-block body on whose outer surface inlet lines and outlet lines are provided. A first conduit places in communication the outlet line with the second inlet line; a second conduit places in communication the first outlet line with the first inlet line; and a third conduit places in communication the first outlet line with the first inlet line. The conduits project from the outer surface that delimits the single-block body.

13 Claims, 6 Drawing Sheets

(51) Int. Cl.
 *F28D 7/00* (2006.01)
 *F28D 9/00* (2006.01)
 *F28D 21/00* (2006.01)
 *F28F 17/00* (2006.01)
(52) U.S. Cl.
 CPC .... *F28D 9/0093* (2013.01); *F28D 2021/0038* (2013.01); *F28F 17/005* (2013.01)

(56) References Cited

U.S. PATENT DOCUMENTS

| | | | | |
|---|---|---|---|---|
| 5,845,505 A | * | 12/1998 | Galus | F28D 9/0068 62/95 |
| 2003/0041619 A1 | | 3/2003 | Lu | |
| 2005/0166622 A1 | * | 8/2005 | Bellemo | B01D 53/265 62/285 |
| 2005/0247075 A1 | * | 11/2005 | Bellemo | F28D 9/0093 62/272 |
| 2005/0284157 A1 | * | 12/2005 | Fijas | B01D 53/265 62/93 |
| 2013/0153170 A1 | * | 6/2013 | Galus | F25B 29/00 165/63 |
| 2016/0346728 A1 | * | 12/2016 | Favero | F28F 17/005 |
| 2019/0105590 A1 | * | 4/2019 | Friestad | F24F 3/153 |

FOREIGN PATENT DOCUMENTS

| | | |
|---|---|---|
| WO | 2007/043078 A1 | 4/2007 |
| WO | 2008/139343 A1 | 11/2008 |
| WO | 2012/107380 A1 | 8/2012 |

* cited by examiner

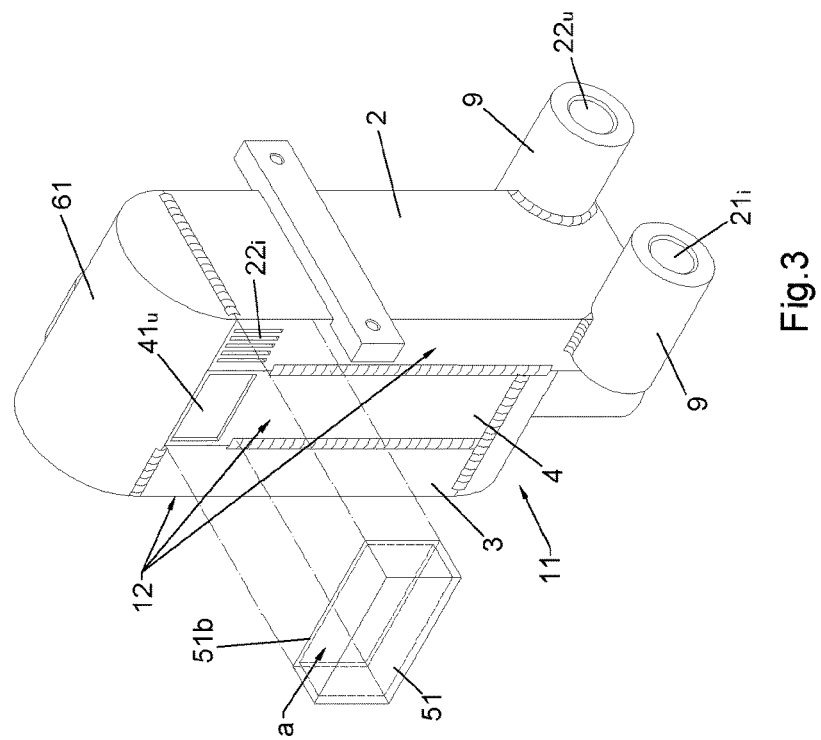
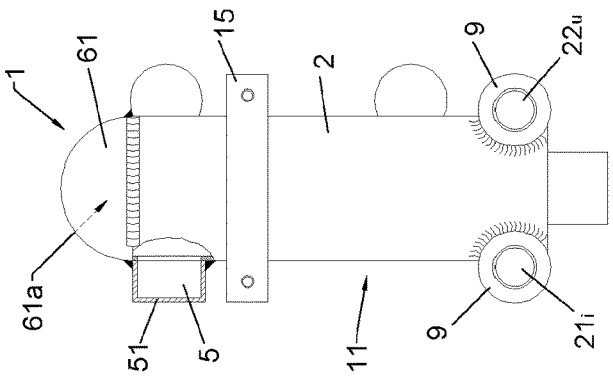
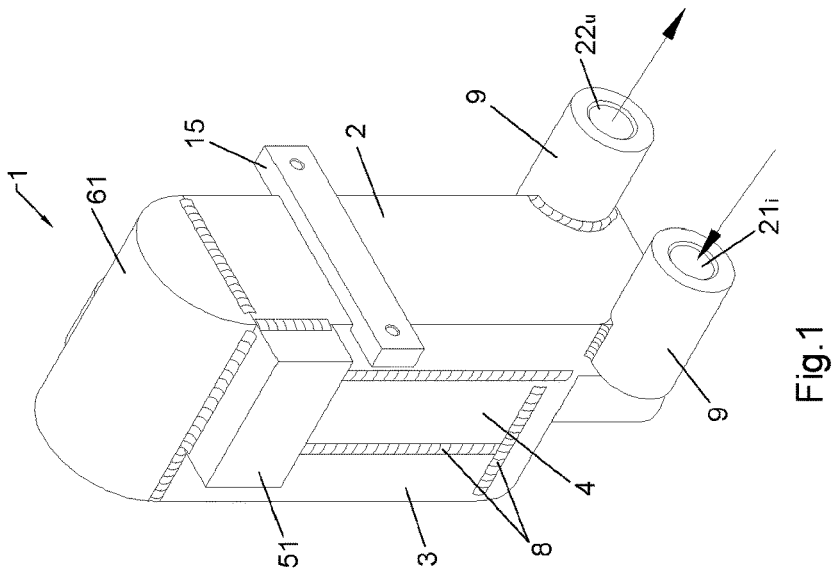

PERFECTED HEAT EXCHANGER AND AIR DRYING SYSTEM USING THE AFORESAID HEAT EXCHANGER

BACKGROUND OF THE INVENTION

1. The Field of the Invention

The invention relates to a countercurrent heat exchanger and preferably but not exclusively of the finned pack type, particularly adapted for drying compressed air.

The invention also relates to a compressed air drying system that uses the heat exchanger of the invention.

2. The Relevant Technology

As is known, in compressed air production systems the air that exits from the compressor must be appropriately dehumidified to prevent, during the adiabatic decompression that it undergoes when it is used, the humidity contained therein from condensing.

For that purpose, continuously operating, direct expansion cooling cycle dryers are used which substantially comprise a countercurrent heat exchanger, in which the hot and humid compressed air coming from the compressor is cooled and dehumidified before being sent to the users.

According to the prior art, heat exchangers of the type described are comprised of two heat exchange units and a condensate separator unit that operatively interact and that comprise:
  a cooler/heater;
  a cooling evaporator of the air coming from the cooler/heater;
  a condensate separator in which the humidity contained in the air coming from the evaporator condenses in the form of large drops and is removed.

In particular, the heater/cooler considerably pre-cools the hot and humid compressed air that comes from the delivery pipe of the compressor by countercurrent heat exchange with the cold and dehumidified compressed air that comes from the condensate separator.

The evaporator in turn receives at the inlet the pre-cooled air exiting from the cooler/heater and cools it to the desired dew point, through heat exchange with a coolant fluid that circulates in countercurrent in the evaporator itself.

In this way the pre-cooled air, as well as the further cooling process, also undergoes a dehumidification process.

Finally, the cold air enters the condensate separator in which the minuscule drops of water that have formed in the evaporator collect on the bottom in the form of water.

The dehumidified cold air then enters the cooler/heater where, as has been mentioned above, it considerably pre-cools the hot and humid compressed air that reaches the delivery pipe of the compressor.

The cold and dried air then exits from the cooler/heater and can be conveyed to the users.

Heat exchangers of the known type described, although being able to supply cooled and dehumidified air in conditions adapted to satisfy users' requirements, do however have some recognised disadvantages and limitations.

First of all, according to the prior art, the functional elements that form the heat exchanger and that, as has been mentioned, comprise a cooler/heater, an evaporator and a condensate separator, are made in a single block and all the conduits and passage lines that place the cooler/heater, the evaporator and the condensate separator in communication with each other are therefore internal to the block.

Therefore, the quality of the connections and seals may only be verified once the assembly is complete.

Furthermore, as once the assembly is complete, the exchanger is presented as a single functional block, it will be impossible to identify in which one or ones of the functional elements that comprise it the possible leak or seal defect is situated.

Finally, a possible repair intervention will be very complex and therefore expensive as the operator must intervene on the completely assembled exchanger and this implies that in the case of leaks it is preferable to scrap the whole exchanger.

SUMMARY OF THE INVENTION

The present invention intends to overcome the listed drawbacks and limitations.

In particular, it is a first object of the invention to realise a heat exchanger comprising functional elements, each of which constitutes an independent element, realised independently from the others according to its own processing cycle.

It is another aim that the exchanger according to the invention is realised following the construction of the various functional elements that comprise it, by mechanical assembly of the functional elements themselves.

It is a further object that also the conduits that place the passage lines of the different functional elements in communication are realised following the assembly of the functional elements themselves.

The listed aims are reached by a heat exchanger according to the main claim to which reference will be made.

The dependent claims describe other characteristics of the heat exchanger of the invention.

Advantageously, the heat exchanger of the invention is easier and more rational to construct with respect to analogous heat exchangers of the prior art as it first envisages the construction of the functional elements, each one independent from the other, and only subsequently the assembly thereof for realising the entire exchanger.

Furthermore, advantageously, each functional element can be tested individually prior to assembly; in this way it is possible to intervene with any repairs, thus reducing waste.

In a further advantageous way, a more reliable product is obtained which improves the possibility of obtaining the constructional, functional and qualitative repetitiveness of the heat exchanger.

Finally, the modularity of the functional elements and the fact that they can be tested before and after assembly enable control of the entire production cycle with an improvement in the quality of the final product.

BRIEF DESCRIPTION OF THE DRAWINGS

The aims and advantages listed will be highlighted better during the description of the exchanger of the invention which is provided below by way of non-limiting example with reference to the appended tables of the drawings in which:

FIG. 1 represents an axonometric view of the exchanger of the invention;
FIG. 2 represents a lateral view of FIG. 1;
FIG. 3 represents a partially exploded view of FIG.1.

DETAILED DESCRIPTION OF THE PREFERRED EMBODIMENTS

The heat exchanger according to the invention is represented in FIGS. 1 to 11 where it is indicated overall with 1.

Figure 5:
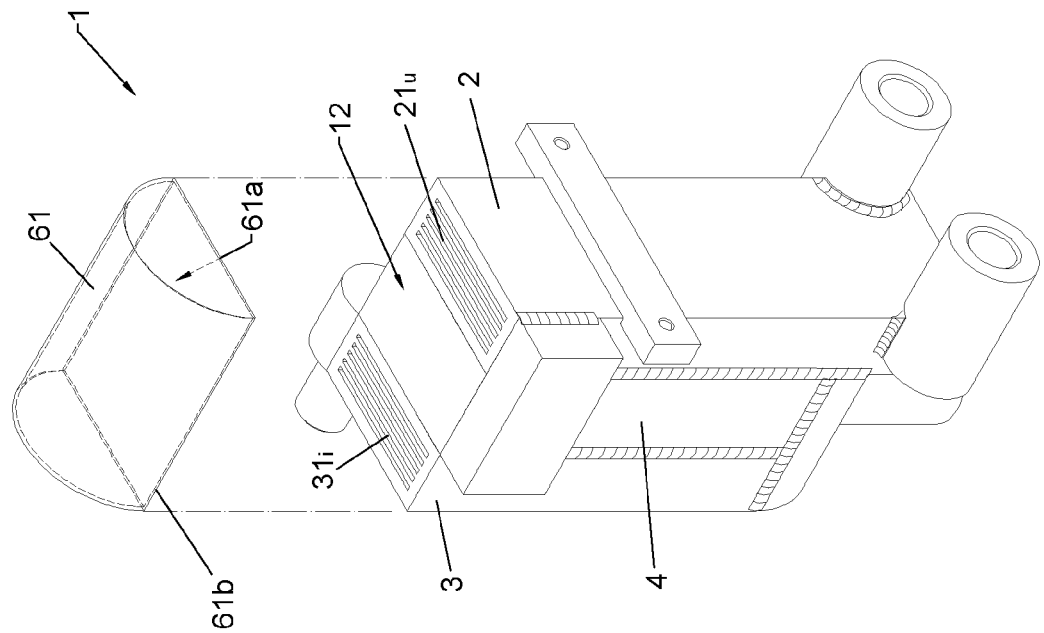
FIG. 5 represents another partially exploded view of FIG. 1.
Figure 4:
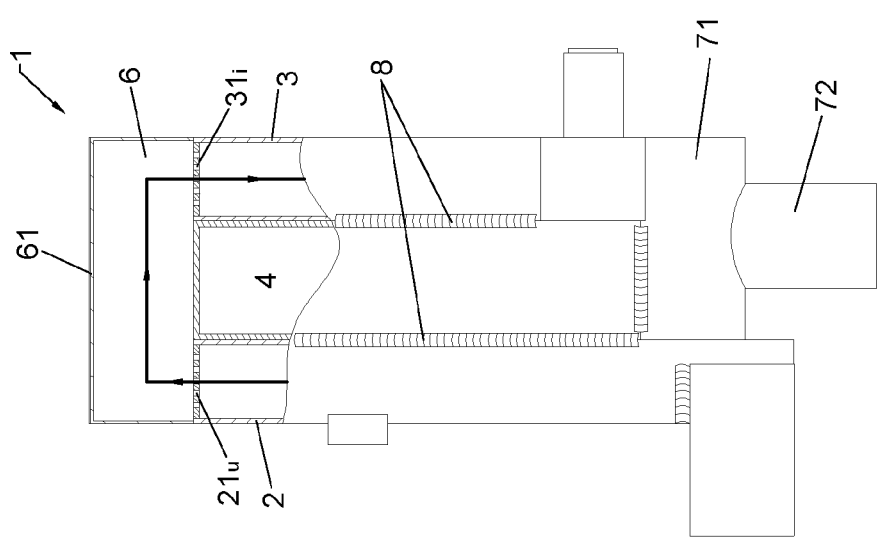
FIG. 4 represents another lateral view of FIG. 1.
Figure 6:
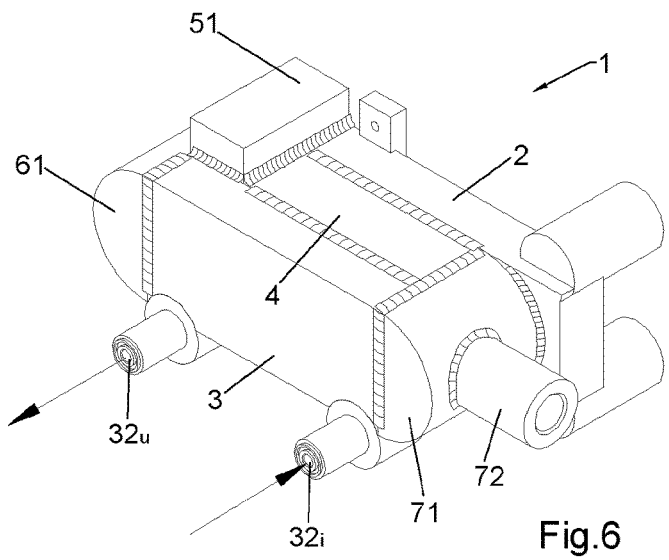
FIG. 6 represents a further view of FIG. 1.
Figure 7:
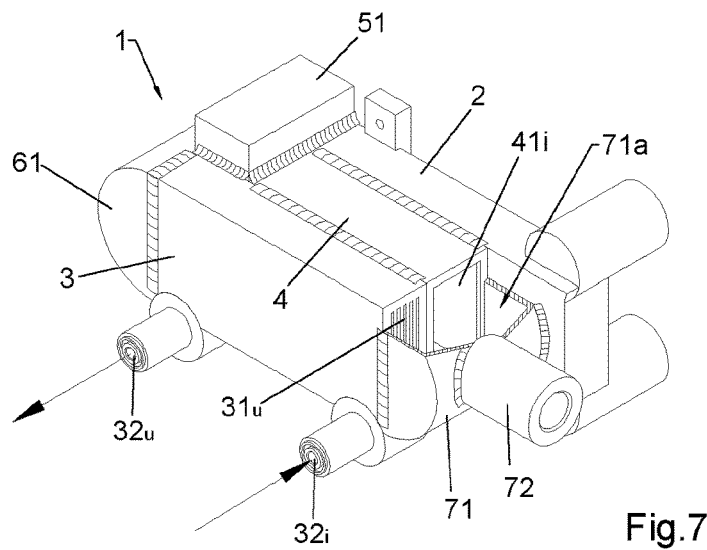
FIG. 7 represents a partially sectioned view of FIG. 6.
Figure 8:
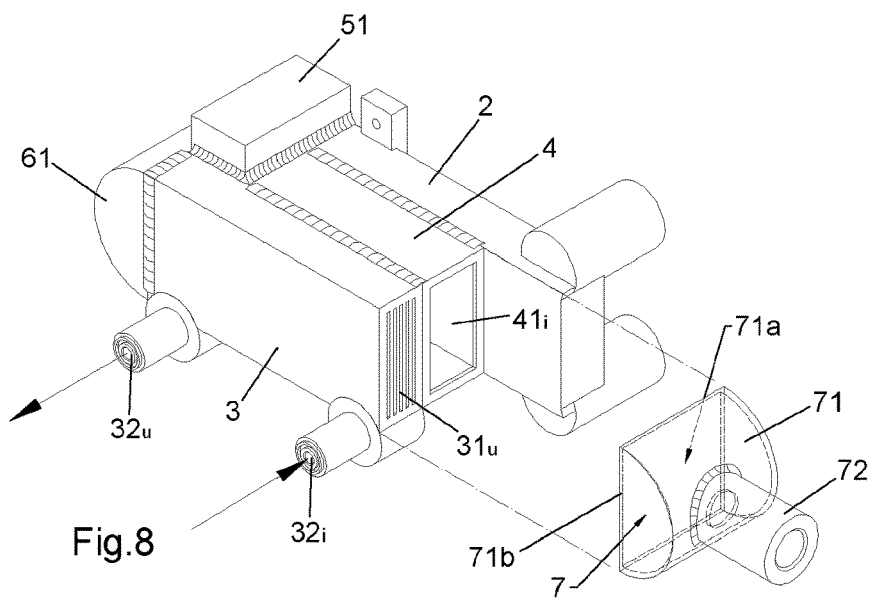
FIG. 8 represents a partially exploded view of FIG. 6.
Figure 9:
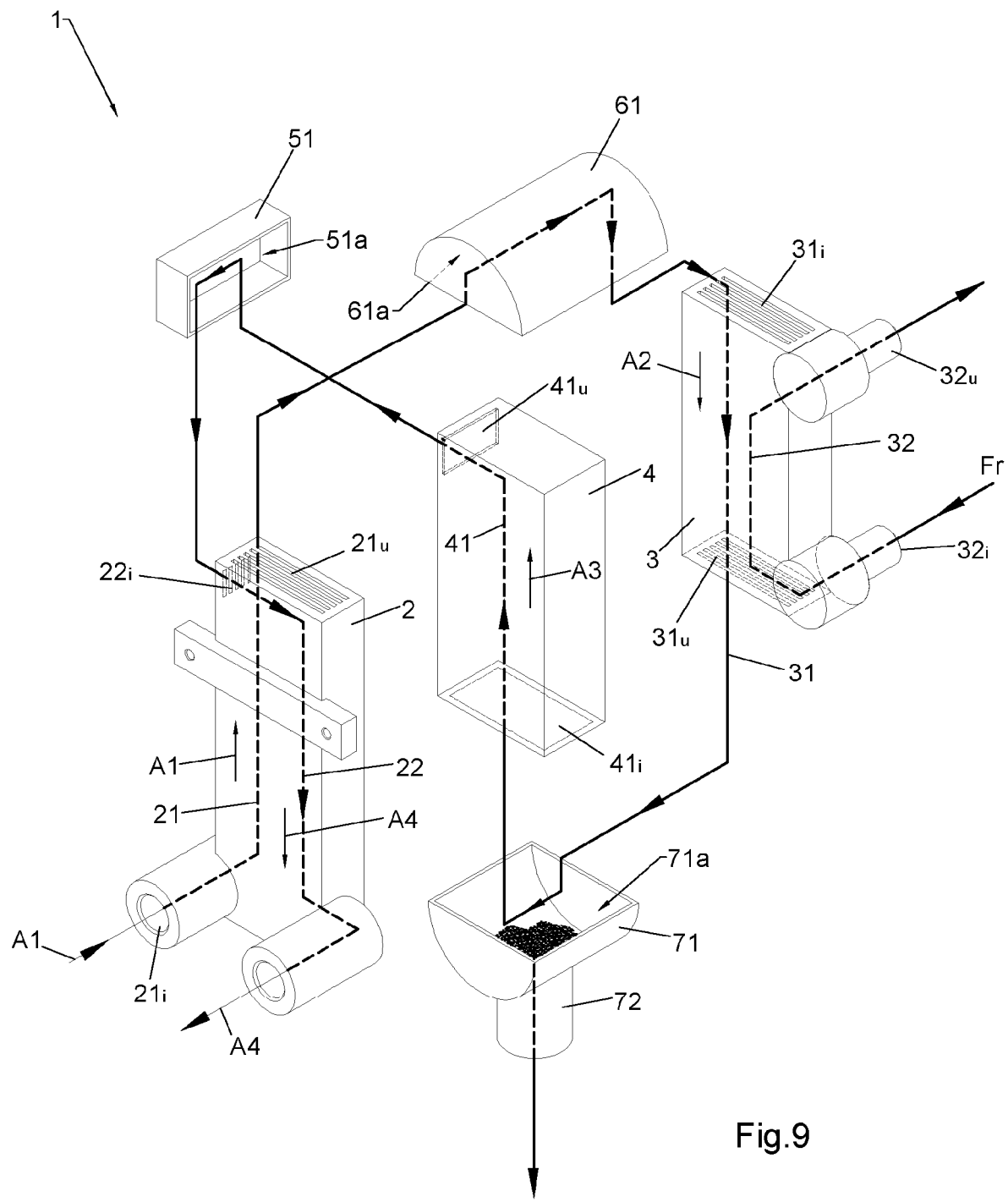
FIG. 9 represents a schematic axonometric view of the exchanger of the invention exploded in the parts that comprise it.
Figure 10:
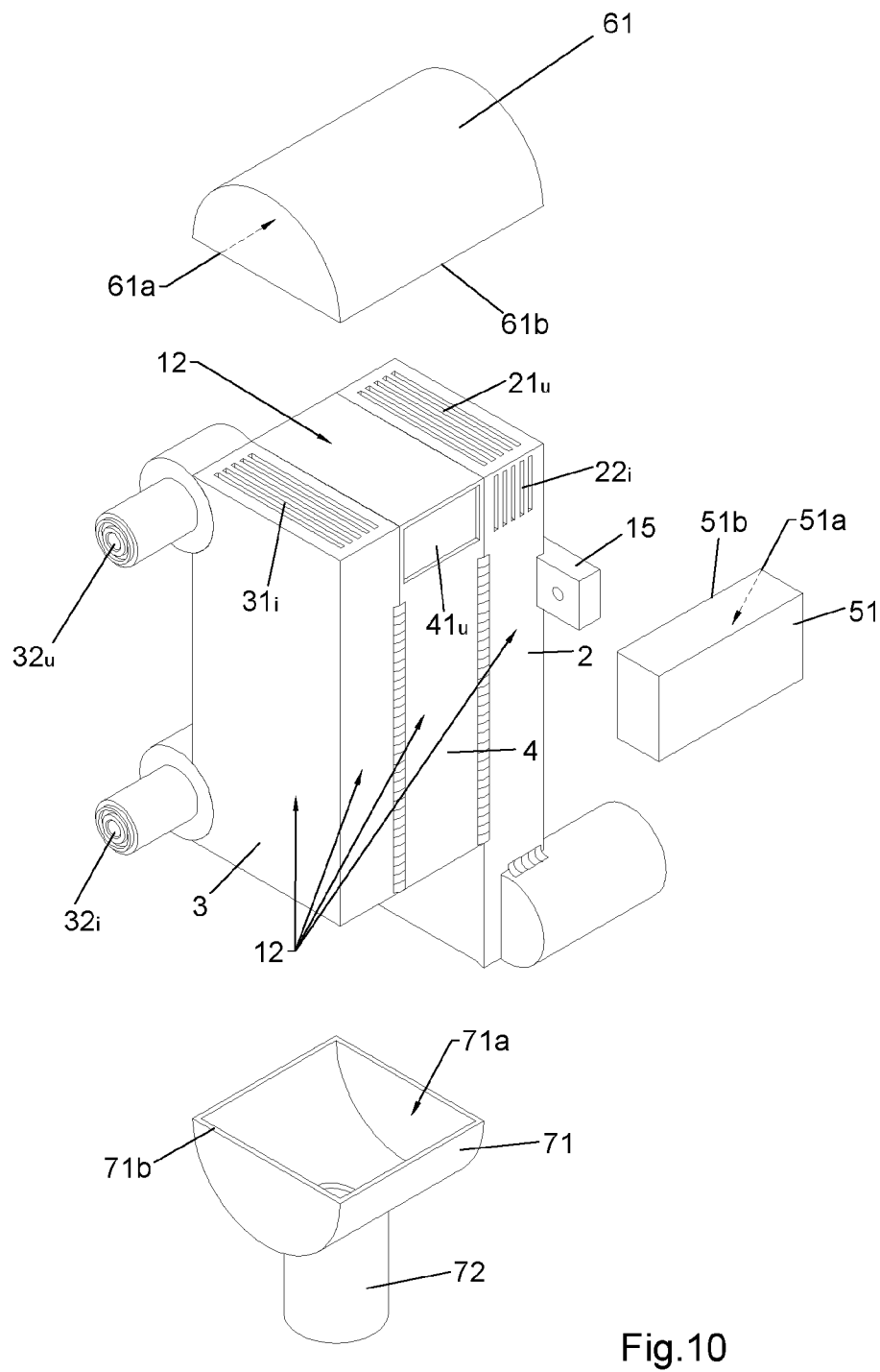
FIG. 10 represents a partial decomposition of the exchanger of the invention in another axonometric view.
Figure 11:
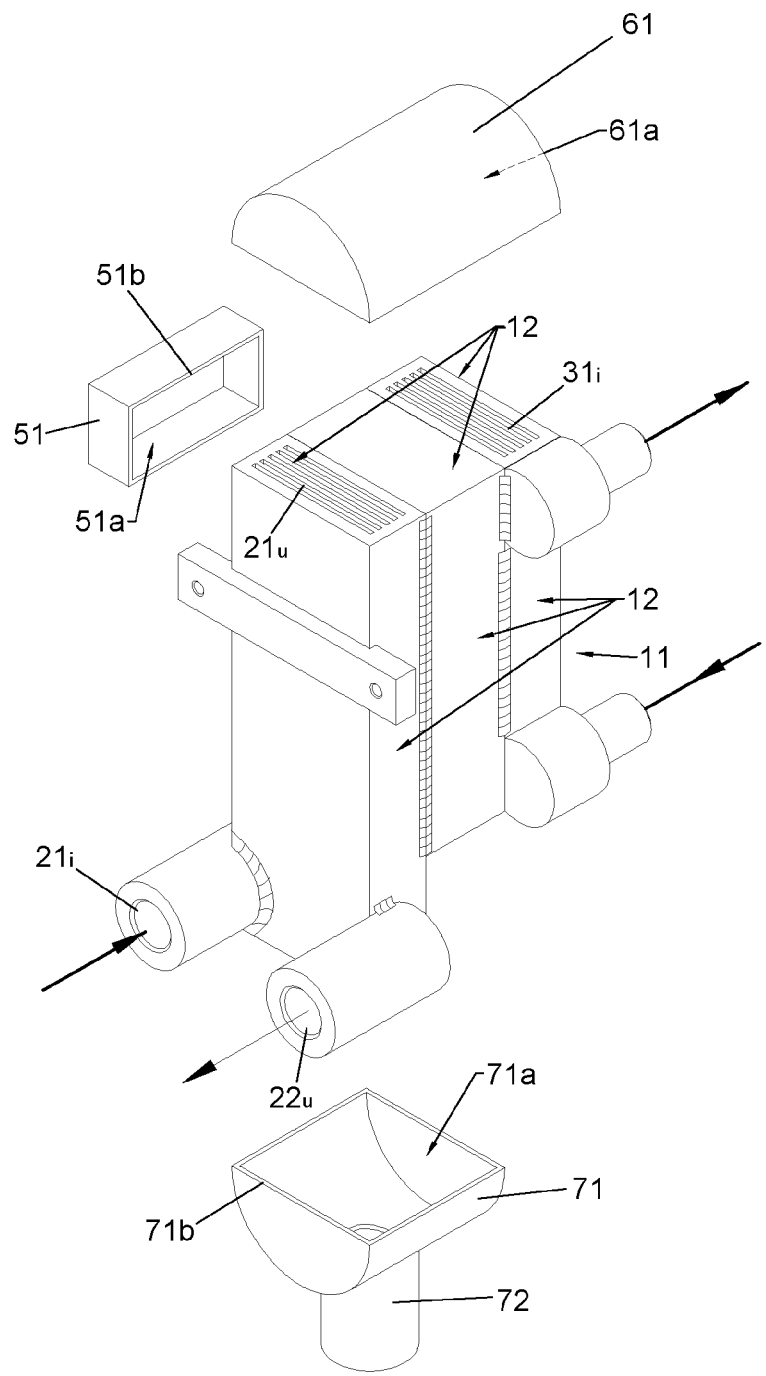
FIG. 11 represents a partial decomposition of the axonometric view of FIG. 1.

With particular reference to FIGS. 1 and 9, it is observed that it comprises three functional elements and more particularly a cooler/heater indicated overall with 2, an evaporator indicated overall with 3 and a condensate separator indicated overall with 4, which are mechanically connected to each other and are operatively connected as will be described below.

In relation to the cooler/heater 2, it is provided internally with heat exchange surfaces that are configured so as to define between them two countercurrent paths that comprise a first path 21 for a flow of hot-humid air A1 that extends between a first inlet line 21$i$ and a first outlet line 21$u$ and a second path 22 for a flow of dehumidified cold air A4 that extends between a second inlet line 22$i$ and a second outlet line 22$u$.

In relation to the evaporator 3, it is also provided internally with heat exchange surfaces that are configured so as to define between them two countercurrent paths that comprise a first path 31 for a flow of partially cooled humid air A2 that comes from the first outlet line 21$u$ of the cooler/heater 2 and that extends between a first inlet line 31$i$ and a first outlet line 31$u$ and a second path 32 for a coolant fluid Fr coming from an external source that extends between a second inlet line 32$i$ and a second outlet line 32$u$.

Finally, in relation to the condensate separator 4, condenser surfaces are provided therein, configured so as to define between them a path 41 for cooled humid air A3 that comes from the first outlet line 31$u$ of the evaporator 3 and that extends between an inlet line 41$i$ and an outlet line 41$u$.

It is appropriate to specify that, in relation to the cooler/heater 2 and the evaporator 3, both are of the finned pack type with countercurrent flows of the known type per se.

For this reason, their internal construction will not be described below as it refers to structures that are known per se.

The same can be said in relation to the condensate separator 4 which is of the known coalescence type.

It is however to be understood that the heat exchange surfaces of the cooler/heater 2 and of the evaporator 3 and the condensing surfaces of the condenser 4 may be of any type according to the prior art.

According to the invention, the cooler/heater 2, the evaporator 3 and the condensate separator 4 are independent units from each other and are joined together by connection means 8 for defining a single-block body 11 on whose outer surface 12 inlet lines 21$i$, 22$i$; 31$i$, 32$i$; 41$i$ and outlet lines 21$u$, 22$u$; 31$u$, 32$u$; 41$u$ are provided.

It is observed, with particular reference to FIGS. 2 to 8, that in the heat exchanger 1 there is a first conduit 5 that places in communication the outlet line 41$u$ of the condensate separator 4 with the second inlet line 22$i$ of the cooler/heater 2.

A second conduit 6 is also provided, which places in communication the first outlet line 21$u$ of the cooler/heater 2 with the first inlet line 31$i$ of the evaporator 3.

Finally, a third conduit 7 is provided, which places in communication the first outlet line 31$u$ of the evaporator 3 with the first inlet line 41$i$ of the condensate separator 4.

As can be noted, the conduits 5, 6, 7 project from the outer surface 12 that delimits the single-block body 11 and each of them is defined between the outer surface 12 of the single-block body 11 and a respective cover 51, 61, 71.

It is observed that each cover has a concave profile 51$a$, 61$a$, 71$a$ delimited by a perimeter edge 51$b$, 61$b$, 71$b$ that is fixed in a sealed way to the outer surface 12 of the single-block body 11 and externally to the perimeter of each pair of lines 22$i$, 41$u$; 21$u$, 31$i$; 31$u$, 41$i$ through connection means 8.

On this point, it is specified that the connection means 8 of the covers 51, 61, 71 to the surface 12 of the single-block body 11 and of the cooler/heater 2, of the evaporator 3 and of the condensate separator 4 between them are comprised of weldings 81.

In another embodiment that is not described herein, the connection means may possibly be comprised of flanged junctions, also possibly joined by means of welding or bolting.

In relation to the covers 51, 61, 71 it is observed that they comprise:

a first cover 51 that is applied on the second inlet line 22$i$ of the cooler/heater 2 and on the first outlet line 41$u$ of the condensate separator 4 for defining the first conduit 5;

a second cover 61 that is applied on the first outlet line 21$u$ of the cooler/heater 2 and on the first inlet line 31$i$ of the evaporator 3 for defining the second conduit 6;

a third cover 71 that is applied on the first outlet line 31$u$ of the evaporator 3 and on the first inlet line 41$i$ of the condensate separator 4 for defining the third conduit 7.

It is also observed that the second inlet line 22$i$ and the second outlet line 22$u$ of the cooler/heater 2, together with the second inlet line 32$i$ and the second outlet line 32$u$ of the evaporator 3, each communicate with a junction sleeve 9 that is fixed, preferably but not necessarily, by welding respectively to the cooler/heater 2 and to the evaporator 3.

Each junction sleeve 9 can therefore be used for connecting the cooler/heater 2 and the evaporator 3 to external pipes.

It is also observed that the third cover 71 is provided with a perforated sleeve 72, which can support a drain tap not shown, which places in communication the third conduit 7 with the external environment for draining via gravity the water that forms by coalescence in the condensate separator 4.

For this purpose, it is observed in the figures that the heat exchanger 1 is provided with a bracket 15 having connection holes to a support surface so as to be arranged in a vertical position which conveys by gravity the condensate water onto the bottom of the third cover 71.

Operatively, the circulation of the air in the heat exchanger of the invention is now described with particular reference to the exploded axonometric representation of FIG. 9.

It is observed that a flow of hot and humid air A1 that comes from the delivery pipe of a compressor, not shown in the figures, enters the cooler/heater 2 through the first inlet line 21$i$ and travels along it according to the first path 21 until reaching the first outlet line 21$u$.

During such path which, as can be observed, takes place travelling along the cooler/heater 2 in the vertical upwards direction, the flow A1 of hot and humid air meets in countercurrent a flow of cold dehumidified air A4 that comes from the first outlet mouth 41*u* of the condensate separator 4 and travels along the cooler/heater 2 downwards between the second inlet line 22*i* and the second outlet line 22*u*.

Along the cooler/heater 2 the flows of air A1 and A4 flow, as mentioned, in countercurrent and without mixing so that the flow of hot and humid air A1 is cooled, yielding heat to the flow of cold dehumidified air A4.

Therefore, in the cooler/heater 2 the initial part of the heat exchange takes place as from the first outlet line 21*u* of the cooler/heater 2 a flow of partially cooled humid air A2 exits, which crosses the second conduit 6, delimited by the first cover 61, is conveyed into the evaporator 3, while the flow of dehumidified cold air A4 which exits from the second outlet line 22*u* of the cooler/heater 2 can be conveyed to be used.

The flow of partially cooled humid air A2 enters into the evaporator 3 through its first inlet line 31*i* and crosses it downwards, undergoing a cooling and dehumidifying process by heat exchange in countercurrent with the cooling fluid Fr which is comprised of a coolant fluid that evaporates and crosses the evaporator 3 entering from the second inlet line 32*i* and exits through the second outlet line 32*u*.

The coolant fluid can come from an external source in the liquid-vapour two-phase condition and flows into the evaporator 3 upwards, being aspirated by a cooling compressor.

The coolant fluid evaporates thanks to the latent and sensitive heat that it absorbs from the compressed air that is thus cooled.

A flow of cooled humid air A3 therefore exits from the first outlet line 31*u* of the evaporator 3, which, through the third conduit 7 delimited by the third cover 71, enters into the condensate separator 4 through the inlet line 41*i*.

The water vapour contained in the cooled humid air A3 starts to condense in the third conduit 7, continues the condensation rising into the condensate separator 4 and is finally collected by dropping in the form of condensate water into the third cover 71 from which it is removed through the drain sleeve 72.

Through the outlet line 41*u* the flow of dehumidified cold air A4 therefore exits from the condensate separator 4 and through the first conduit 5 delimited by the first cover 51 it is conveyed into the second inlet line 22*i* of the cooler/heater 2 in which the cycle is concluded.

As mentioned in the introductory part, the invention also relates to a drying system of the compressed air produced by a compressor, and such drying system comprises at least one perfected exchanger of the invention.

Based on the description, it is understood that the exchanger of the invention reaches all the aims and all the advantages listed in the introductory part.

First of all, the object of the invention to realise a heat exchanger comprising independent functional elements, each of which constitutes an independent element, realised independently from the others according to its own processing cycle, is reached.

Furthermore, the conduits that place the passage lines of the different functional elements in communication are realised following the assembly of the functional elements themselves.

This is made possible as the passage lines of the fluids through the functional elements of the exchanger are all realised on the outer surfaces of the functional block comprised of the functional elements when they are connected to each other.

Furthermore, such lines communicate with each other through the aforesaid channels that are obtained by applying, above and perimetrally to the lines that need to communicate with each other, appropriate concave covers fixed to the outside of the functional block comprising the functional elements connected to each other.

Advantageously, the heat exchanger of the invention is therefore easier and more rational to construct with respect to analogous heat exchangers of the prior art as it first envisages the construction of the functional elements, each one independent from the other, and only subsequently the assembly thereof for realising the entire exchanger.

Again advantageously, this particular type of construction enables each functional element to be tested individually prior to assembly and this enables any faulty functional elements to be identified so as to be able to repair or possibly eliminate them.

This, as already mentioned, is not possible in heat exchangers of the known type.

During the operation stage, modifications and variations not mentioned in the description and also not shown in the drawings may be made to the heat exchanger of the invention.

However, it is to be understood that should such modifications and variations fall within the following claims, they are all to be considered protected by the present patent.

The invention claimed is:

1. A heat exchanger particularly adapted for cooling and dehumidifying air, comprising:
    a cooler/heater provided with heat exchange surfaces configured so as to define between them two countercurrent paths that comprise:
        a first path for a flow of hot and humid air, which extends between a first inlet line and a first outlet line;
        a second path for a flow of cold dehumidified air, which extends between a second inlet line and a second outlet line;
    an evaporator provided with heat exchange surfaces configured so as to define between them two countercurrent paths that comprise:
        a first path for a flow of partially cooled humid air, coming from said first outlet line of said cooler/heater, which extends between a first inlet line and a first outlet line;
        a second path for a coolant fluid, coming from an external source, which extends between a second inlet line and a second outlet line;
    a condensate separator, in which condenser surfaces are provided, configured so as to define between them a path for cooled humid air coming from said first outlet line of said evaporator, which extends between an inlet line and an outlet line,
    said cooler/heater, said evaporator and said condensate separator being separate and discrete units that each independently encircle the paths extending therethrough and which are joined together by separate connection means for defining a single-block body on whose outer surface said inlet lines and said outlet lines are provided, further comprising:
        a first conduit that places in communication said outlet line of said condensate separator with said second inlet line of said cooler/heater;

a second conduit that places in communication said first outlet line of said cooler/heater with said first inlet line of said evaporator;

a third conduit that places in communication said first outlet line of said evaporator with said first inlet line of said condensate separator, said conduits being arranged projecting externally from said outer surface that delimits said single-block body;

further comprising:

said cooler/heater comprising a first outer wall that encircles said first path and said second path thereof;

said evaporator comprising a second outer wall that encircles said first path and said second path thereof; and said condensate separator comprising a third outer wall that encircles said path thereof, wherein said first outer wall, said second outer wall, and said third outer wall are separate and discrete walls with said connecting means connecting said first outer wall to said third outer wall and connecting said second outer wall to said third outer wall so that said condensate separator is disposed between said cooler/heater and said evaporator, wherein said cooler/heater, said evaporator and said condensate separator are joined together by said connection means after being manufactured independently from each other.

2. The heat exchanger according to claim 1, wherein said conduits are defined between said outer surface of said single-block body and covers with a concave profile, each of which has a perimeter edge which is sealingly fixed to said outer surface of said single-block body and externally to the perimeter of each pair of said lines, through said connection means.

3. The heat exchanger according to claim 2, wherein said covers comprise:

a first cover that is applied to said second inlet line of said cooler/heater and to said outlet line of said condensate separator for defining said first conduit;

a second cover that is applied to said first outlet line of said cooler/heater and to said first inlet line of said evaporator for defining said second conduit;

a third cover that is applied to said first outlet line of said evaporator and to said first inlet line of said condensate separator for defining said third conduit.

4. The heat exchanger according to claim 1, wherein said second inlet line and said second outlet line of said cooler/heater and said second inlet line and said second outlet line of said evaporator each communicate with a junction sleeve adapted for connection with a corresponding inlet or outlet pipe.

5. The heat exchanger according to claim 3, wherein in said third cover a perforated sleeve is provided, for draining the condensate.

6. The heat exchanger according to claim 1, wherein said cooler/heater, said evaporator and said condensate separator are of the finned pack type with countercurrent flow.

7. The heat exchanger according to claim 1, wherein said condensate separator is of the coalescence type.

8. The heat exchanger according to claim 1, wherein said connection means are weldings.

9. The heat exchanger according to claim 1, wherein said connection means are flanged junctions.

10. A compressed air drying system comprising at least one heat exchanger for cooling and drying the compressed air produced by a compressor unit, wherein said heat exchanger is realised according to claim 1.

11. The heat exchanger according to claim 1, wherein the connecting means comprises welding.

12. The heat exchanger according to claim 1, wherein said first path and said second path of said cooler/heater each comprise:

first portions that cross over and extend orthogonal to each other; and second portions that extend parallel to each other.

13. A method for forming the heat exchanger according to claim 1, the method comprising:

independently forming each of said cooler/heater, evaporator and condensate separator; and joining together the formed cooler/heater, evaporator and condensate separator using said connection means.

* * * * *